(12) United States Patent
Kishine

(10) Patent No.: US 8,743,266 B2
(45) Date of Patent: Jun. 3, 2014

(54) FOCUS EXTENDING OPTICAL SYSTEM AND EDOF IMAGING SYSTEM

(71) Applicant: Fujifilm Corporation, Tokyo (JP)

(72) Inventor: Yasunobu Kishine, Saitama (JP)

(73) Assignee: Fujifilm Corporation, Tokyo (JP)

(*) Notice: Subject to any disclaimer, the term of this patent is extended or adjusted under 35 U.S.C. 154(b) by 0 days.

(21) Appl. No.: 14/036,120

(22) Filed: Sep. 25, 2013

(65) Prior Publication Data

US 2014/0022440 A1  Jan. 23, 2014

Related U.S. Application Data

(63) Continuation of application No. PCT/JP2012/056366, filed on Mar. 13, 2012.

(30) Foreign Application Priority Data

Mar. 31, 2011  (JP) .................................. 2011-079261

(51) Int. Cl.
*H04N 5/225* (2006.01)
*H04N 5/232* (2006.01)
*G03B 13/00* (2006.01)

(52) U.S. Cl.
USPC ........................................... 348/340; 348/345

(58) Field of Classification Search
CPC ....................... G02B 27/0075; G02B 27/0025
USPC ................. 348/340, 345, 335, 336, 341
See application file for complete search history.

(56) References Cited

U.S. PATENT DOCUMENTS

| 8,294,764 | B2 | 10/2012 | Mathieu |
| 8,611,030 | B2* | 12/2013 | Alon et al. ................... 359/896 |
| 2005/0264886 | A1* | 12/2005 | Dowski, Jr. .................. 359/558 |
| 2009/0141140 | A1* | 6/2009 | Robinson .................. 348/222.1 |
| 2010/0039689 | A1* | 2/2010 | Sayag ........................... 359/241 |
| 2010/0053361 | A1 | 3/2010 | Sugita et al. |

(Continued)

FOREIGN PATENT DOCUMENTS

| JP | 2006-094471 | 4/2006 |
| JP | 2007-206738 | 8/2007 |

(Continued)

OTHER PUBLICATIONS

International Search Report PCT/JP2012/056366 dated Jun. 12, 2012, with English translation.

(Continued)

*Primary Examiner* — Sinh Tran
*Assistant Examiner* — Shahbaz Nazrul
(74) *Attorney, Agent, or Firm* — Young & Thompson

(57) ABSTRACT

A focus extending optical system has optical lenses and a focus extender. The optical lenses form an image of light, from an object, on an image sensor. The focus extender adjusts a wavefront so as to change a position of the image, formed by the optical lenses, in accordance with a distance from an optical axis and thereby extends a focus range. The focus extending optical system satisfies a condition that a value of a second MTF is less than or equal to three times a value of a first MTF. The first MTF is an MTF at a spatial frequency of ½ of a Nyquist frequency of the image sensor. The second MTF is an MTF at a spatial frequency of ¼ of the Nyquist frequency.

10 Claims, 17 Drawing Sheets

(56) References Cited

U.S. PATENT DOCUMENTS

| | | | |
|---|---|---|---|
| 2010/0110179 A1* | 5/2010 | Zalevsky et al. | 348/135 |
| 2010/0110275 A1 | 5/2010 | Mathieu | |
| 2010/0165134 A1* | 7/2010 | Dowski et al. | 348/218.1 |
| 2010/0328517 A1 | 12/2010 | Mathieu | |

FOREIGN PATENT DOCUMENTS

| | | |
|---|---|---|
| JP | 2008-245266 | 10/2008 |
| JP | 2010-109625 | 5/2010 |
| WO | 2008105431 | 9/2008 |
| WO | 2009061519 | 5/2009 |
| WO | 2009106996 | 9/2009 |

OTHER PUBLICATIONS

Written Opinion of the International Searching Authority dated Jun. 6, 2012.

* cited by examiner

FOCUS EXTENDING OPTICAL SYSTEM AND EDOF IMAGING SYSTEM

BACKGROUND OF THE INVENTION

1. Field of the invention

The present invention relates to an optical system (hereinafter referred to as the focus extending optical system) for extending depth of field of optical lens(es) and an EDoF imaging system for performing a restoration process (deconvolution process) on an image, captured with the focus extending optical system, to sharpen the image.

2. Description Related to the Prior Art

Mobile phones, PDAs, and small notebook computers have normally been equipped with digital cameras. Generally, for example, a fixed-focus optical lens has been used for the digital camera installed in the mobile phone or the like to reduce the size and cost of the digital camera. Such digital camera has not been required to capture high quality images. Recently, however, even the simple digital camera has been required to improve image quality.

The digital camera installed in the mobile phone or the like is used for image capture of an object at a distance of several ten centimeters to several meters. To be more specific, the digital camera is used for imaging an object such as a person or a landscape several meters away from the digital camera. The digital camera is also used for reading characters, a two-dimensional code, or the like several ten centimeters away from the digital camera. To capture images at object distances in a wide range, the digital camera is required to focus in accordance with the object distance. However, it is difficult to provide a focus adjustment mechanism in the digital camera installed in the mobile phone or the like because the digital camera needs to be compact and inexpensive.

For this reason, in a device such as the mobile phone, an EDoF (Extended Depth of Field) imaging system has been employed as a digital camera which covers object distances ranging from a macro imaging range in the order of several ten centimeters to approximate infinity with no focus adjustment and the like (see U.S. Pat. No. 8,294,764 (corresponding to Japanese Patent No. 2010-213274), Japanese Patent No. 2007-206738, and Japanese Patent No. 2006-094471). The EDoF imaging system captures an image with the use of a focus extending optical system. The focus extending optical system uses a phase plate or the like to have focal lengths that differ in accordance with a distance (incidence height) from an optical axis. The EDoF imaging system sharpens a captured blurred image through a restoration process. Thereby an image equivalent to that captured with optical lens (es) with wide depth of field is obtained.

When the EDoF imaging system captures an image of characters, a two-dimensional code, or the like, being an object at a near view, it is necessary that the obtained image allows not only human eyes but also software such as an OCR (Optical Character Recognition) application or a decode application to correctly recognize the characters or the like. People and software such as the OCR recognize characters or the like differently. The software may not correctly recognize the characters or the like in the image even if they are legible to the human eyes.

A conventional EDoF imaging system has extended depth of field, so that the characters or the like in an image (hereinafter referred to as the near view image) of a near view are legible to people. However, it is difficult for the conventional EDoF imaging system to capture an image of characters or the like which are accurately recognizable to the software such as the OCR.

It is necessary to improve the so-called image quality such as contrast and resolution to allow the software such as the OCR to recognize the characters or the like in the near view image. However, the image quality and the depth of field are in a trade-off relationship in the EDoF imaging system. Accordingly, it is necessary to reduce the depth of field to improve a character recognition rate of the software. This impairs the original function of the EDoF imaging system, that is, to extend the depth of field.

SUMMARY OF THE INVENTION

An object of the present invention is to provide a focus extending optical system and an EDoF imaging system for improving a recognition rate, for characters or the like in a near view image, of an OCR or the like without reduction in depth of field.

The focus extending optical system according to the present invention comprises an optical lens and a focus extender. The optical lens forms an image of light, from an object, on an image sensor. The focus extender adjusts a wavefront so as to change a position of the image, formed by the optical lens, in accordance with a distance from an optical axis and thereby extends a focus range. A condition that a value of a second MTF is less than or equal to three times a value of a first MTF is satisfied where the first MTF is an MTF at a spatial frequency of ½ Nyquist frequency of the image sensor and the second MTF is an MTF at a spatial frequency of ¼ Nyquist frequency of the image sensor.

It is preferable that a range of a coefficient in which the second MTF is less than or equal to three times the first MTF includes zero and magnification of the range is greater than or equal to 0.6 where a transmitted wavefront $\psi$ is represented by an expression $\psi = \Sigma K_j \cdot Z_j$ using Zernike polynomials $Z_j(n, m)$ and a coefficient $K_j$ and the coefficient $K_4$ represents a coefficient of a fourth term $Z_4(n=2, m=0)$ representing defocus.

It is preferable that the range of the coefficient $K_4$ in which the second MTF is less than or equal to three times the first MTF includes zero and magnification of the range is greater than or equal to 0.9.

It is preferable that the range of the coefficient $K_4$ in which the second MTF is less than or equal to three times the first MTF includes zero and magnitude of the range on a negative side is greater than or equal to 0.3.

It is preferable that the range of the coefficient $K_4$ in which the second MTF is less than or equal to three times the first MTF includes zero and the magnitude of the range on a negative side is greater than or equal to 0.6.

It is preferable that the second MTF is greater than or equal to 0.4.

It is preferable that the second MTF is greater than or equal to 0.5.

It is preferable that the optical lens and the focus extender are fixed so as not to move in a direction of an optical axis.

The EDoF imaging system according to the present invention comprises an image sensor and a focus extending optical system. The image sensor captures an image of an object. The focus extending optical system has at least one optical lens and a focus extender. The at least one optical lens forms the image of light, from the object, on the image sensor. The focus extender adjusts a wavefront so as to change a position of the image, formed by the optical lens, in accordance with a distance from an optical axis and thereby extends a focus range of the optical lens. A condition that a value of a second MTF is less than or equal to three times a value of a first MTF is satisfied where the first MTF is an MTF at a spatial frequency of ½ Nyquist frequency of the image sensor and the second MTF is an MTF at a spatial frequency of ¼ Nyquist frequency of the image sensor.

It is preferable that the EDoF imaging system further comprises an image processor for performing a restoration process on data, outputted from the image sensor, to produce an image in which depth of field is extended.

According to the present invention, the software improves the recognition rate for characters or the like in the near view image without reduction in the depth of field.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
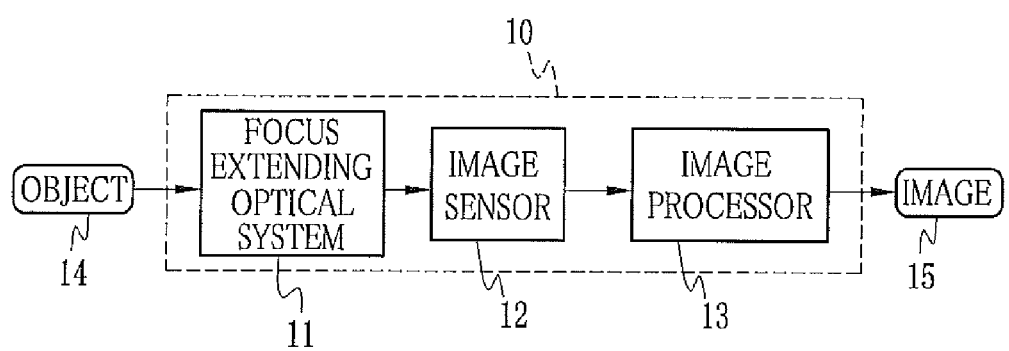
FIG. 1 is a block diagram illustrating configuration of an EDoF imaging system.

As shown in FIG. 1, an EDoF imaging system 10 comprises a focus extending optical system 11, an image sensor 12, and an image processor 13. The EDoF imaging system 10 is mainly used in two ways. The first is to capture a distant view, for example, a landscape or people, at a distance from several meters to infinity. The second is to capture a near view, for example, characters or a two-dimensional code, at a distance in the order of several ten centimeters.

The focus extending optical system 11 forms an image of light, reflected from the object 14, on an image sensor 12. The focus extending optical system 11 includes optical lenses and a focus extender for extending the focus of the optical lenses, which will be described below. For example, the focus extending optical system 11 converges light rays on and close to an optical axis to a front side (object 14 side). The focus extending optical system 11 converges light rays passing an outer portion to a rear side (image sensor 12 side). Thereby the focus extending optical system 11 varies the focus in accordance with an incidence height.

The focus extending optical system 11 is designed to have optical performance actually required for a specific EDoF imaging system 10. In this embodiment, a fixed-focus optical lens with an F number (Fn) of 2.29 is used. Resolution $\delta$ of an optical lens is in inverse proportion to the F number (Fn) and satisfies $\delta = 1/Fn/\lambda$ where $\lambda$ (nm) denotes a reference wavelength. When the reference wavelength $\lambda = 546$ nm, the resolution $\delta$ of the focus extending optical system 11 is approximately 800 lines/ram, which is substantially equal to a sampling frequency fs of the image sensor 12 and approximately twice as much as a Nyquist frequency Ny. The sampling frequency fs of the image sensor 12 will be described below.

As described in the following, the focus extending optical system 11 is formed such that an MTF (Modulation Transfer Function) value at a low frequency of ¼ the Nyquist frequency Ny is less than or equal to three times an MTF value at a high frequency of ½ the Nyquist frequency Ny. As for the defocus MTF, the focus extending optical system 11 is formed such that a range in which the MTF value at the low frequency of ¼ the Nyquist frequency Ny is less than or equal to three times the MTF value at the high frequency of ½ the Nyquist frequency Ny is greater than that of a spherical optical lens, more specifically, greater than or equal to 1.5 times the range of the spherical optical lens.

The image sensor 12 photoelectrically converts an image of the object 14, formed by the focus extending optical system 11, into RAW data on a pixel by pixel basis. Thereby the image sensor 12 captures an image. The image sensor 12 outputs the RAW data to the image processor 13. The image sensor 12 is disposed such that an imaging surface is located within a focus range of the focus extending optical system 11. Pixels are arranged in the imaging surface.

Note that the image sensor 12 is provided with performance required for the EDoF imaging system 10. In an example below, a pixel pitch p is 1.25 μm. Namely, in the image sensor 12, the sampling frequency fs is fs=1/p=800 lines/mm. The Nyquist frequency Ny is 400 lines/mm.

The image processor 13 is composed of a DSP (Digital Signal Processor), DIP (Digital Image Processor), or the like. The image processor 13 performs various types of image processing on the RAW data outputted from the image sensor 12. Thereby the image processor 13 converts the RAW data into an entirely sharp image 15. To be more specific, the image processor 13 performs a restoration process, a noise reduction process, a color mixture correction process, a shading correction process, a white balance adjustment process, a synchronization process, a color matrix correction process, a YC conversion process, a γ correction process, and an edge enhancement process on the RAW data in this order to produce the image 15 in a predetermined format (for example, JPEG).

Figure 2:
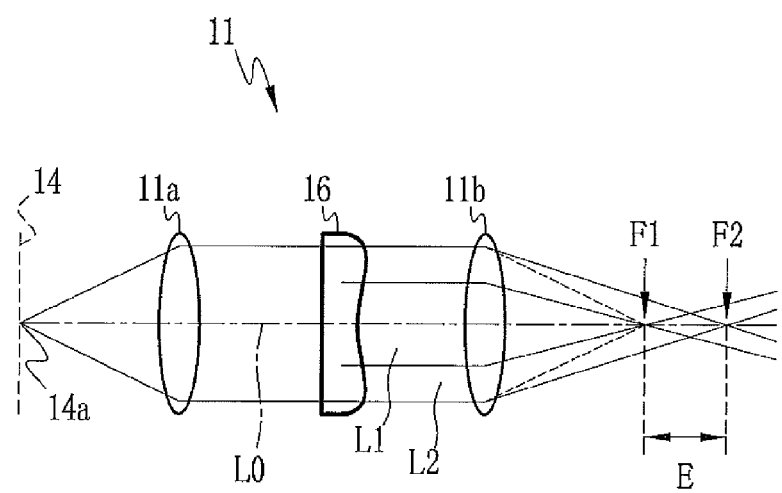
FIG. 2 is an explanatory view of configuration of a focus extending optical system.

As shown in FIG. 2, the focus extending optical system 11 comprises optical lenses 11a and 11b, and a focus extender 16, for example. The optical lens 11a converts light, reflected as spherical waves from a point 14a on the object, into plane waves and makes the plane waves incident on the focus extender 16. The optical lens 11b converges the light incident from the focus extender 16. The focus extender 16 adjusts wavefronts of the plane waves, incident from the optical lens 11a, such that a distance for light rays (hereinafter referred to as the inner light rays) L1 to be converged by the optical lens 11b differs from that for light rays (hereinafter referred to as the outer light rays) L2 to be converged by the optical lens 11b. The inner light rays L1 refer to the light rays which pass through a ce portion, including an optical axis L0, of the focus extender 16. The outer light rays L2 refer to the light rays passing outside of the inner light rays L1. To be more specific, the focus extending optical system 11 converges the inner light rays L1 with a small incidence height onto a near focal point F1 and converges the outer light rays L2 with a large incidence height onto a far focal point F2. Hence, in the focus extending optical system 11, the focal point is extended to a focus range E between the near focal point F1 and the far focal point F2. Because the image sensor 12 is disposed at a predetermined position within the focus range E as described above, an image converged on the focal point F1, an image converged on the focal point F2, or an image converged on a point between the focal points F1 and F2 in a blurred state is convoluted in the RAW data outputted from the image sensor 12. Hereinafter, the image sensor 12 is disposed at the focal point F2 such that the distant view plane set to infinity is at the best focus position.

Figure 3A:
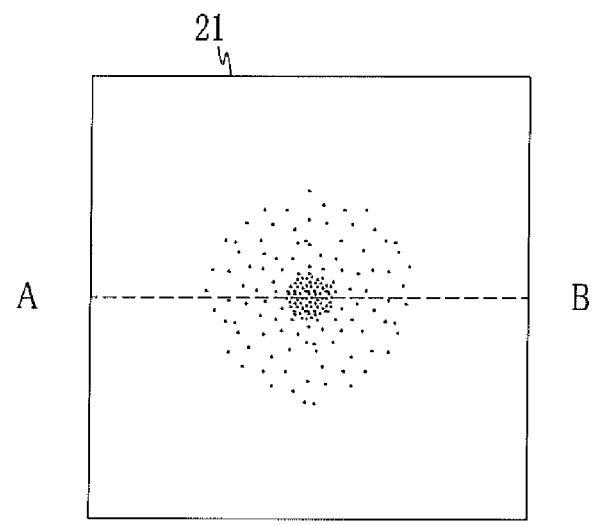
FIG. 3A is a schematic view illustrating RAW data of an image of an arbitrary point on an object.
Figure 3B:
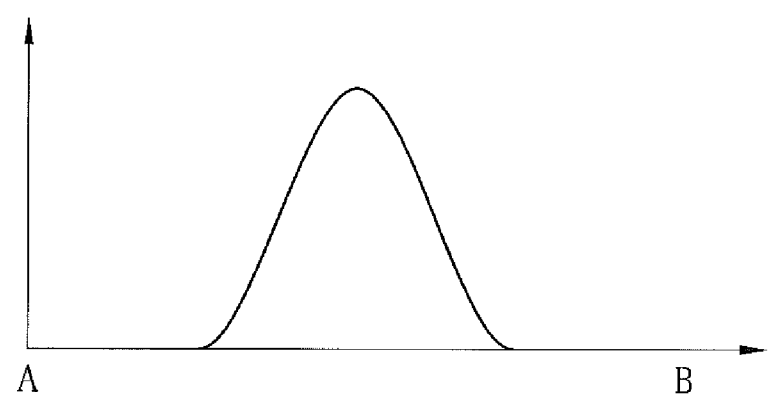
FIG. 3B is a graph schematically illustrating distribution of pixel values of a point image in the RAW data.
Figure 3C:
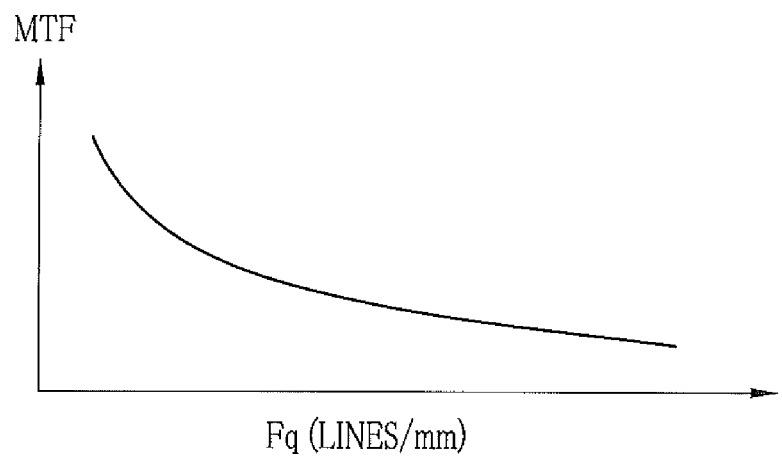
FIG. 3C is a graph schematically illustrating frequency MTF of the RAW data.

As shown in FIG. 3A, in the RAW data 21 outputted from the image sensor 12, an image of a point 14a on the object 14 blurs depending on the position of the image sensor 12. For example, as shown in FIG. 3B, in the image of the point 14a, pixel values are distributed broadly in a line A-B direction of the RAW data 21. As shown in FIG. 3C, if the RAW data 21 is used without any image processing, MTF (hereinafter referred to as frequency MTF) relative to spatial frequency Fq decreases abruptly as the spatial frequency Fq increases. Hence, the resolution is low.

Figure 3D:
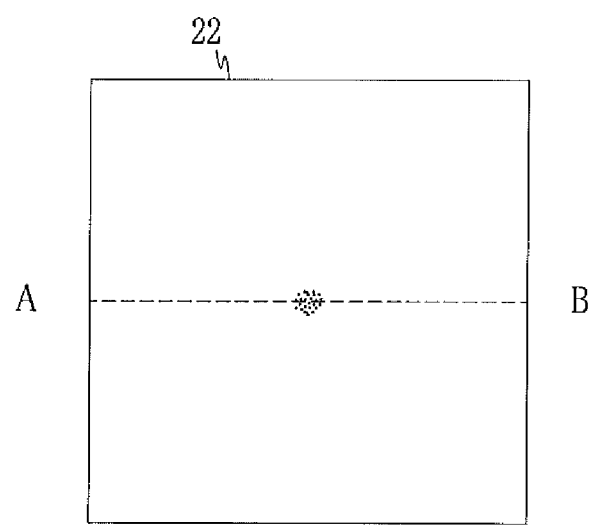
FIG. 3D is a schematic view illustrating image data of a point image after a restoration process.
Figure 3E:
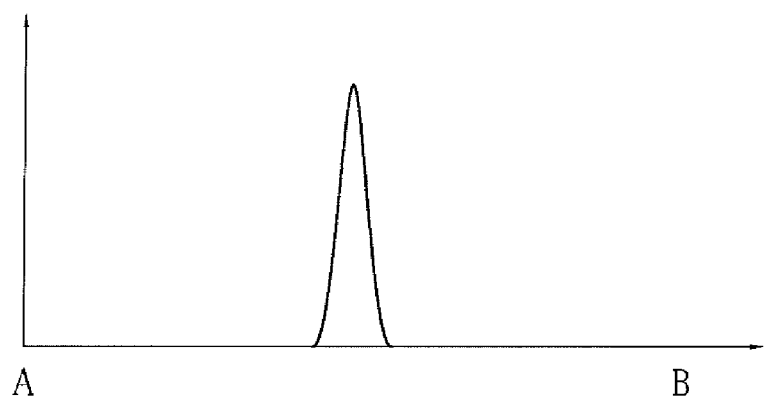
FIG. 3E is a graph schematically illustrating distribution of pixel values of the point image after the restoration process.
Figure 3F:
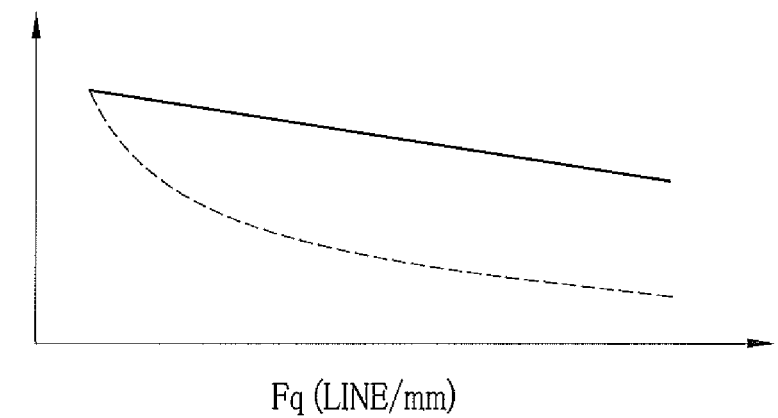
FIG. 3F is a graph schematically illustrating the frequency MTF after the restoration process.

However, the restoration process (the so-called deconvolution process) performed by the image processor 13 changes the image of the point 14a into a blur-free point image like image data 22, after the restoration process, shown in FIG. 3D. Namely, the restoration process sharpens the broad distribution of pixel values (FIG. 3B) into a distribution with a steep peak as shown in FIG. 3E. Thereby, as shown in FIG. 3F, the frequency MTF recovers to a level similar to that of an image captured with a standard fixed-focus optical lens and thus predetermined resolution is achieved. The restoration process sharpens each of the images focused on the focal points F1 and F2 (or a point between the focal points F1 and F2), convoluted in the RAW data 21, in accordance with the focal point in a manner similar to the image of the point 14a described by way of example. Hence, an image 15 is captured with depth of field greater than that of an image captured with the fixed-focus optical lens.

Figure 4:
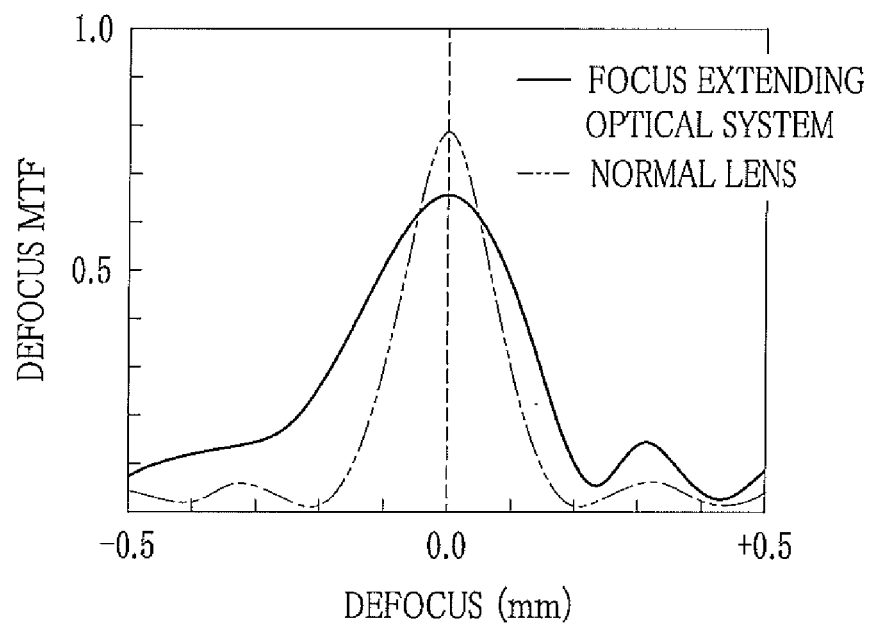
FIG. 4 is a graph illustrating defocus MTF of each of a standard optical lens and the focus extending optical system.

As shown in FIG. 4, when a common fixed-focus optical lens (hereinafter referred to as the standard optical lens) used in a mobile phone or the like in a manner similar to the focus extending optical system 11 is compared with the focus extending optical system 11 with respect to a change in MTF (hereinafter referred to as defocus MTF) relative to defocus, the MTF value of the standard optical lens at the best focus position (the position in which defocus=0.0 mm) is greater than that of the focus extending optical system 11. However, the MTF of the standard optical lens decreases more abruptly than that of the focus extending optical system 11 when a focus position is shifted from the best focus position. This indicates that an image of the object, captured with the standard optical lens, blurs significantly even if the focus position is slightly shifted from the best focus position. When the image sensor 12 is disposed at the focal point F2 within the focus range E, the MTF at the best focus position indicates resolution of an image of a distant view at infinity, for example. The position defocused in the order of −0.3 to −0.5 mm indicates resolution of an image of a near view. Hence, the standard optical lens captures an image of a landscape or a person, being the distant view, with high resolution. However, the resolution of an image of a near view captured with the standard optical lens is low. For example, when an image of characters or the like on a sheet of paper or a monitor is captured with the standard optical lens, it is difficult for human eyes to read the characters or the like in the image.

In the focus extending optical system 11, the MTF of the distant view and the MTF of the near view are in a trade-off relationship. Hence, at the best focus position, the MTF of the focus extending optical system 11 is slightly smaller than that of the standard optical lens. However, the MTF of the focus extending optical system 11 decreases gradually even if the focus position is shifted from the best focus position. The MTF of the focus extending optical system 11 remains greater than or equal to a predetermined value such that the image can be sharpened by the restoration process. The image 15 is produced by performing the restoration process on the RAW data captured with the focus extending optical system 11. Thereby, the characters or the like in the near view image can be read at least by the human eyes.

A graph of the defocus MTF of the standard optical lens depicts a curve symmetrical about the best focus position regardless of the direction (positive or negative) of the defocus relative to the best focus position. On the other hand, the graph of the defocus MTF of the focus extending optical system 11 is a curve asymmetrical about the best focus position so as to improve the MTF at the near view. Thereby, the resolution greater than or equal to a predetermined value is obtained when the focus position is shifted in a negative direction.

As described above, the focus extending optical system, capable of obtaining the near view image with the characters or the like legible to the human eyes, is produced to have various properties. The characters or the like, legible to the human eyes, may not be recognized correctly by software such as OCR (Optical Character Recognition) because the human eyes and the software recognize the character or the like differently.

The higher the contrast, the more legible the characters or the like will be when an image with the resolution of a certain level is viewed with human eyes. When the software such as the OCR is used, a waveform of an image is more important than the contrast of the image. For example, the recognition rate for the characters or the like increases as the waveform becomes similar to a rectangular wave. The recognition rate for the characters or the like tends to decrease as the waveform becomes similar to a triangle wave even if the image has high contrast and the characters or the like are legible to the human eyes. As described above, the recognition rate of the software to recognize the characters or the like increases as the resolution (MTF) increases. The focus extending optical system also needs to maintain the image quality of a distant view image. The frequency MTF, for the distant view image, at the best focus position and the frequency MTF, for the near view image, at a negative defocus position are in a trade-off relationship. Hence, the frequency MTF at the negative defocus position is improved to allow the software to accurately recognize the characters or the like in the near view image at the expense of the frequency MTF for the distant view image.

In at least the best focus position of the focus extending optical system 11 constituting the EDoF imaging system 10, a ratio between the frequency MTF at ½ Ny and the frequency MTF at ¼ Ny is determined such that a value of the frequency MTF at the low frequency of ¼ the Nyquist frequency (hereinafter referred to as ¼ Ny) is less than or equal to three times a value of the frequency MTF at the high frequency of ½ the Nyquist frequency (hereinafter referred to as ½ Ny). Thereby, the EDoF imaging system 10 allows the human eyes to easily recognize the characters or the like in the near view image and also allows the software such as the OCR to accurately recognize the characters or the like in the near view image without loss in image quality of the distant and near view images.

Hereinafter, an operation for adjusting a ratio between the frequency MTF at ½ Ny and the frequency MTF at ¼ Ny is described. Note that, the resolution δ of the focus extending optical system is approximately equal to the sampling frequency is (approximately 800 lines/mm) of the image sensor 12. Hence, the resolution of the EDoF imaging system 10 is based on the sampling frequency fs (800 lines/mm) of the image sensor 12. In the EDoF imaging system 10, ½ Ny equals to 400 lines/mm. ¼ Ny equals to 200 lines/mm. A width (stroke width) between the characters or the like in the near view image differs depending on a condition such as the imaging distance. Hereinafter, for the sake of simplicity, the width between the characters or the like in the near view image is in the order of two or three pixels. The characters or the like are an image with a high frequency in the order of ½ Ny.

Figure 5:
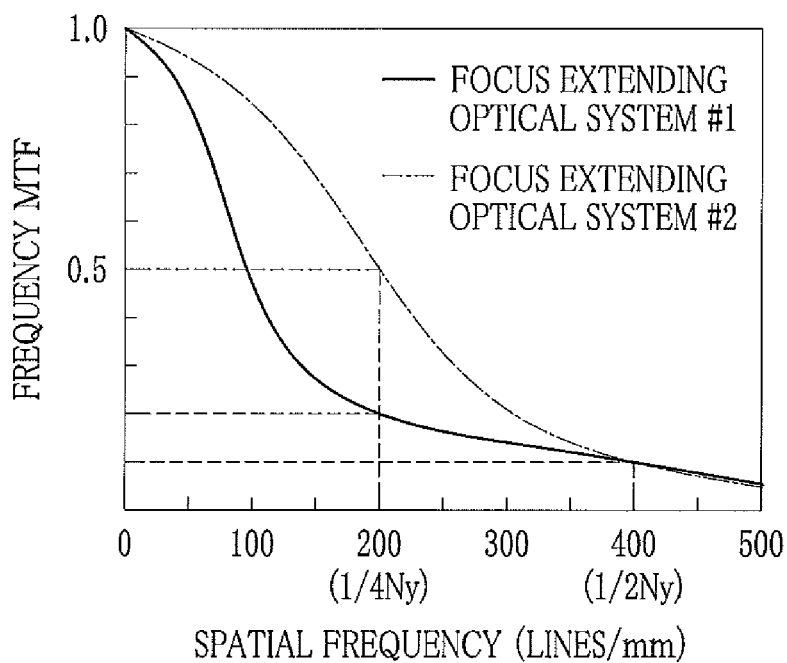
FIG. 5 illustrates a graph of frequency MTF of each of focus extending optical systems #1 and #2.

As shown in FIG. 5, two types of the focus extending optical systems at their best focus positions (defocus 0.0 mm) are compared with each other by way of example. In a focus extending optical system #1, the frequency MTF at ½ Ny is 0.1. The frequency MTF at ¼ Ny is 0.2. Hence, a ratio between the frequency MTF at ½ Ny and the frequency MTF at ¼ Ny is 1:2. The focus extending optical system #1 satisfies the requirement for the focus extending optical system 11 that the frequency MTF at ¼ Ny is less than or equal to three times the frequency MTF at ½ Ny.

In a focus extending optical system #2, the frequency MTF at ½ Ny is 0.1, which is similar to that of the focus extending optical system #1. The frequency MTF at ¼ Ny is 0.5, which is greater than that of the focus extending optical system #1. In the focus extending optical system #2, a ratio between the frequency MTF at ½ Ny and the frequency MTF at ¼ Ny is 1:5. The focus extending optical system #2 does not satisfy the requirement for the focus extending optical system 11 that the frequency MTF at ¼ Ny is less than or equal to three times the frequency MTF at ½ Ny.

Figure 6A:
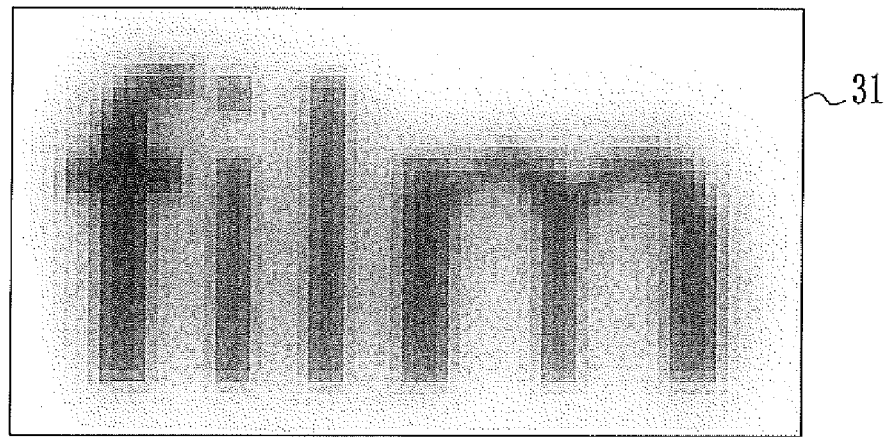
FIG. 6A is an image obtained using the focus extending optical system #1.
Figure 6B:
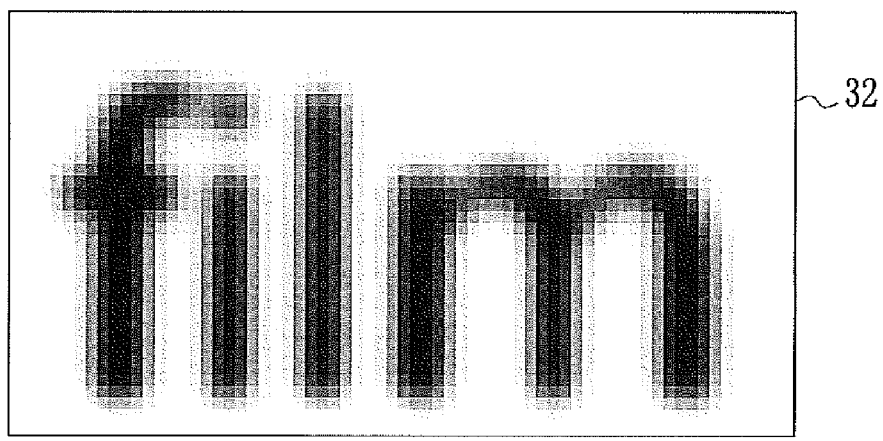
FIG. 6B is an image obtained using the focus extending optical system #2.

FIG. 6A illustrates an image of characters "film" captured with the above-described focus extending optical system #1 at predetermined imaging conditions. FIG. 6B illustrates an image of the characters "film" captured with the above-described focus extending optical system #2 at the predetermined imaging conditions. Each of FIG. 6A and FIG. 6B is obtained by simulation.

When an image 31 illustrated in FIG. 6A obtained by the focus extending optical system #1 is compared with an image 32 illustrated in FIG. 6B obtained by the focus extending optical system #2, the characters "film" in each image is sufficiently legible to the human eyes. The contrast of the image 31 obtained by the focus extending optical system #1 is lower than that of the image 32 obtained by the focus extending optical system #2. Hence, the characters "film" in the image 32 obtained by the focus extending optical system #2 is more easily recognizable than those in the image 31.

When the OCR software is used for recognition of the characters "film", the OCR software correctly recognizes the characters "film" in the image 31 of FIG. 6A obtained by the focus extending optical system #1. However, the OCR software cannot correctly recognize the characters "film" in the image 32 of FIG. 6B obtained by the focus extending optical system #2. This is because a waveform of concentration distribution of the characters in the image 31 obtained by the focus extending optical system #1 is similar to a rectangular wave though the contrast of the image 31 is low, and a waveform of concentration distribution of the characters in the image 32 obtained by the focus extending optical system #2 is similar to a triangle wave though the contrast of the image 32 is high.

A waveform of a captured image is changed by adjusting the ratio between the frequency MTF at ½ Ny and the frequency MTF at ¼ Ny.

Figure 7A:
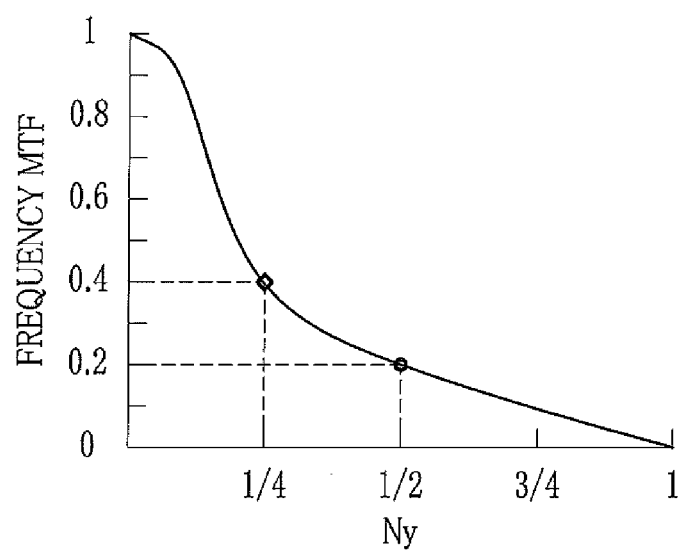
FIG. 7A is a graph illustrating frequency MTF of a focus extending optical system #3.
Figure 7B:
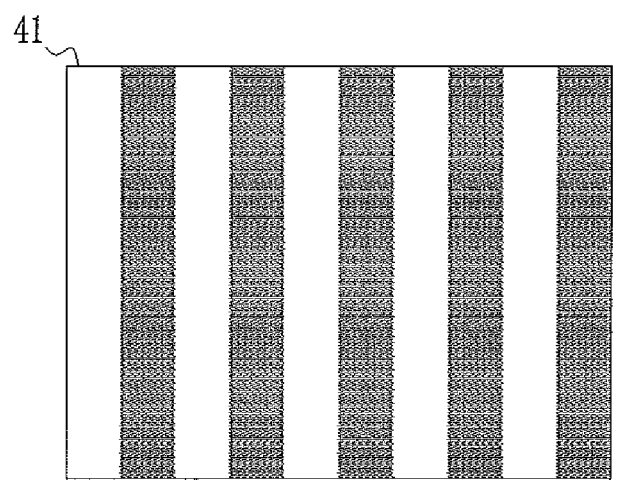
FIG. 7B is a schematic view of a chart image captured with the focus extending optical system #3.
Figure 7C:
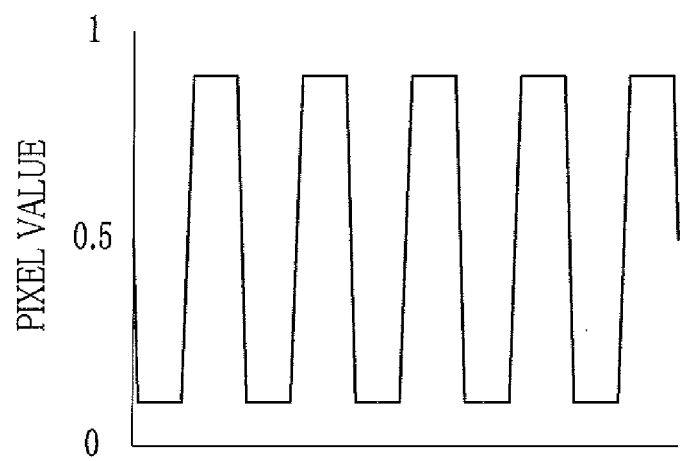
FIG. 7C is a graph illustrating a waveform of an image captured with the focus extending optical system #3.
Figure 8A:
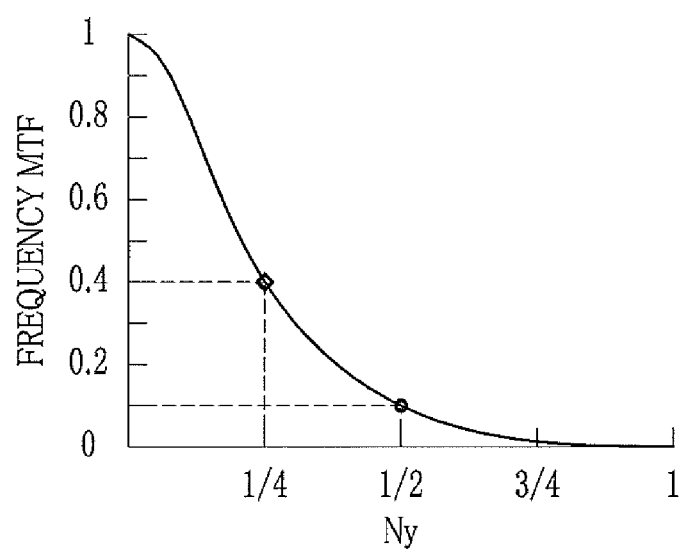
FIG. 8A is a graph illustrating frequency MTF of a focus extending optical system #4.

For example, as shown in FIG. 7A, when a focus extending optical system #3 with the frequency MTF of 0.2 at ½ Ny and the frequency MTF of 0.4 at ¼ Ny is used, the ratio between the frequency MTF at ½ Ny and the frequency MTF at ¼ Ny is 1:2. When an image of a high frequency chart in the order of ½ Ny is captured with the focus extending optical system #3, a chart image 41 is obtained. The chart image 41 has high contrast as shown in FIG. 7B. The chart image 41 has a waveform of a substantially perfect rectangular wave as shown in FIG. 7C. As shown in FIG. 8A, when a focus extending optical system #4 with the frequency MTF of 0.1 at ½ Ny and the frequency MTF of 0.4 at ¼ Ny is used, the ratio between the frequency MTF at ½ Ny and the frequency MTF at ¼ Ny is 1:4. When the focus extending optical system #4 is compared with the focus extending optical system #3, the frequency MTF at ½ Ny of the focus extending optical system

Figure 8B:
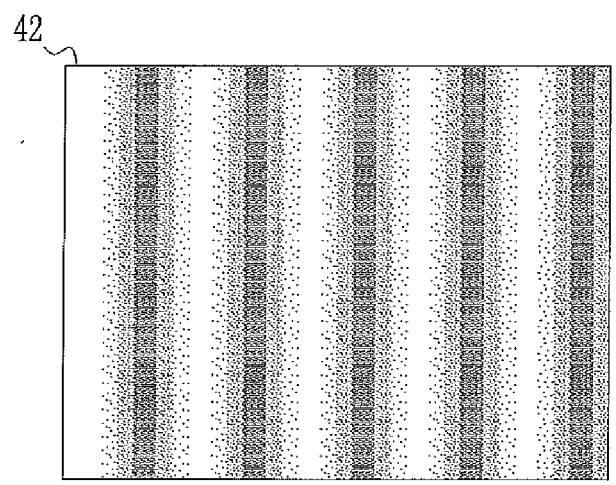
FIG. 8B is a schematic view illustrating a chart image captured with the focus extending optical system #4.
Figure 8C:
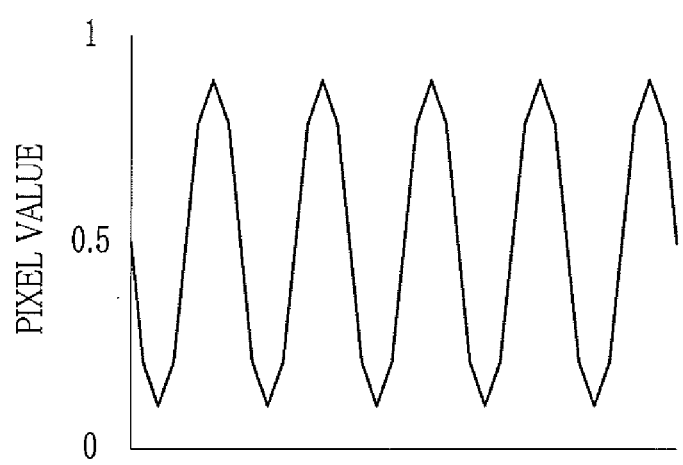
FIG. 8C is a graph of a waveform of an image captured with the focus extending optical system #4.

4 is half of that of the focus extending optical system #3. The frequency MTF at ¼ Ny of the focus extending optical system #4 is the same as that of the focus extending optical system #3. When an image of the high frequency chart in the order of ½ Ny is captured with the focus extending optical system #4, a chart image 42 is obtained. As shown in FIG. 8B, contrast of the chart image 42 is substantially the same as that of the chart image 41 captured with the focus extending optical system #3. As shown in FIG. 8C, a waveform of the chart image 42 is similar to a triangle wave.

Figure 9A:
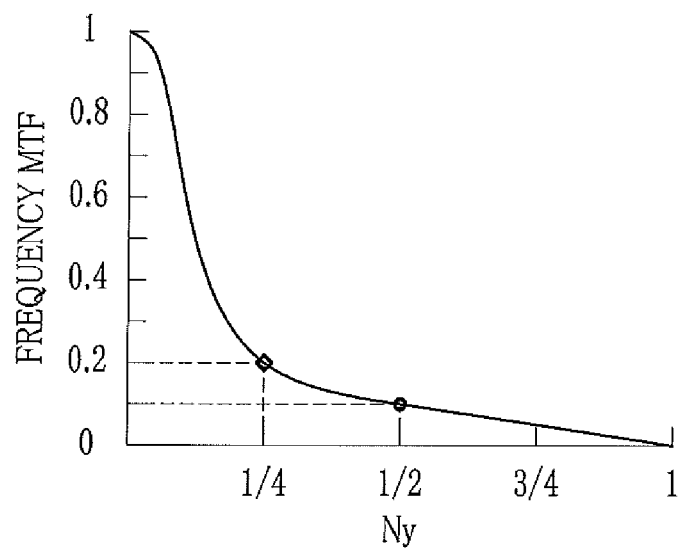
FIG. 9A is a graph illustrating frequency MTF of a focus extending optical system #5.

As shown in FIG. 9A, when a focus extending optical system #5 with the frequency MTF of 0.1 at ½ Ny and the frequency MTF of 0.2 at ¼ Ny is used, the ratio between the frequency MTF at ½ Ny and the frequency MTF at ¼ Ny is 1:2. When the focus extending optical system #5 is compared with the focus extending optical system #3 illustrated in FIG. 7A, the ratios between the frequency MTF at ½ Ny and the frequency MTF at ¼ Ny are the same, but the frequency MTF at ½ Ny of the focus extending optical system #5 is half of that of the focus extending optical system #3 and the frequency MTF at ¼ Ny of the focus extending optical system #5 is half of that of the focus extending optical system #3. When the focus extending optical system #5 is compared with the focus extending optical system #4 in FIG. 8A, the frequency MTFs at ½ Ny are the same, but the frequency MTF at ¼ Ny of the focus extending optical system #5 is half of that of the focus extending optical system #4. The ratio between the frequency MTF at ½ Ny and the frequency MTF at ¼ Ny in the focus extending optical system #5 differs from that in the focus extending optical system #4.

Figure 9B:
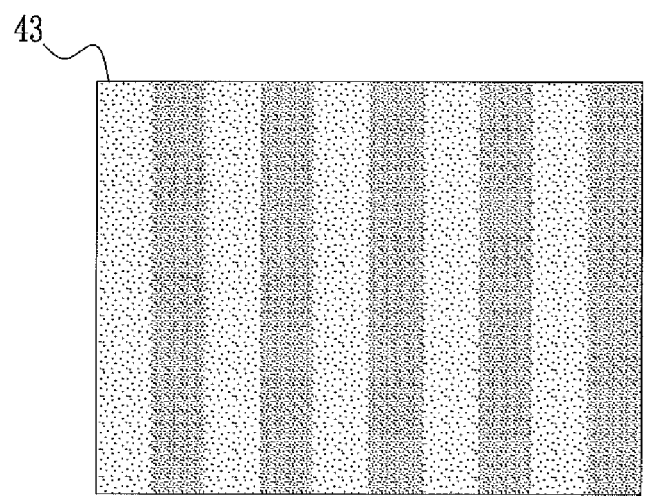
FIG. 9B is a schematic view illustrating a chart image captured with a focus extending optical system #5.
Figure 9C:
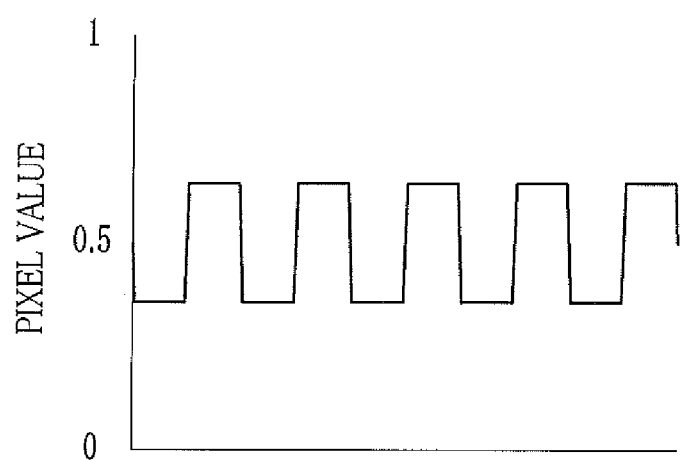
FIG. 9C is a graph illustrating a waveform of an image captured with the focus extending optical system #5.

When an image of the high frequency chart in the order of ½ Ny is captured with the focus extending optical system #5, a chart image 43 is obtained. As shown in FIG. 9B, contrast of the chart image 43 is lower than that of the chart images 41 and 42 captured with the focus extending optical systems #3 and #4. As shown in FIG. 9C, a waveform of the chart image 43 is similar to a rectangular wave.

As shown by the comparison between the focus extending optical systems #3 to #5 of FIGS. 7A, 8A, and 9A, the waveform of the image becomes similar to the rectangular wave as the ratio of the frequency MTF at ¼ Ny relative to the frequency MTF at ½ Ny (the frequency MTF at ¼ Ny/the frequency MTF at ½ Ny) decreases when images of the same high frequency chart are captured.

Chart images similar to the above-described images are produced using the simulation with different ratios between the frequency MTF at ½ Ny and the frequency MTF at ¼ Ny. A correlation between the waveform of the produced chart image and the triangle and rectangular waves is obtained. When the ratio between the frequency MTF at ½ Ny and the frequency MTF at ¼ Ny (the frequency MTF at ½ Ny: the frequency MTF at ¼ Ny) is greater than 1:3, namely, the frequency MTF at ¼ Ny is greater than three times the frequency MTF at ½ Ny, the waveform of the chart image has a higher correlation with the triangle wave than the rectangular wave. On the other hand, when the ratio between the frequency MTF at ½ Ny and the frequency MTF at ¼ Ny is less than or equal to 1:3, namely, the frequency MTF at ¼ Ny is less than or equal to three times the frequency MTF at ½ Ny, the waveform of the chart image has a higher correlation with the rectangular wave than the triangle wave. Hence, the focus extending optical system 11 incorporated in the EDoF imaging system 10 is formed to satisfy the condition that the ratio between the frequency MTF at ½ Ny and the frequency MTF at ¼ Ny is less than or equal to 1:3.

Note that, the relationship between the waveform of the image and the frequency MTFs at ½ Ny and ¼ Ny at the best focus position (defocus±0.0 mm) has been described. The EDoF imaging system 10 performs image processing on a blurred image, captured in a position other than the best focus position, to restore the image. Thereby, the EDoF imaging system 10 increases the depth of field. To increase the depth of field, the focus extending optical system 11 needs to satisfy the above-described condition at least at the best focus position. However, it cannot be said that a near view image with a high recognition rate is obtained easily if the above-described condition is satisfied only in an extremely narrow range close to the best focus position.

Hence, it is preferable to satisfy the above-described condition in a certain amount of range relative to defocus. In the focus extending optical system 11, a range of a coefficient $K_4$ (which will be described below) of a fourth term $Z_4$ of Zernike polynomials, in which the best focus position is included and the ratio between the frequency MTF at ½ Ny and the frequency MTF at ¼ Ny is less than or equal to 1:3, is preferably greater than or equal to 0.6 (the same as that of the standard optical lens), more preferably greater than or equal to 0.75 (1.25 times that of the standard optical lens), and particularly preferably greater than or equal to 0.9 (1.5 times that of the standard optical lens).

Hereinafter, the defocus MTF relative to the coefficient $K_4$ and a range in which the ratio between the frequency MTF at ½ Ny and the frequency MTF at ¼ Ny is less than or equal to 3 are described. Note that, the Zernike polynomials Z are represented by the following expression 1 using a distance $\rho$ ($\rho<1$) from the optical axis, an angle $\theta$ from a predetermined direction (for example, a direction S), and integers m, n, and s. The wavefront $\psi$ of the focus extending optical system 11 is represented by $\psi=\Sigma Kj \cdot Zj$ using a coefficient Kj. The fourth term $Z_4$(n=2, m=0) represents the defocus of the wavefront. The coefficient $K_4$ represents magnitude of the defocus. A relationship between the coefficient $K_4$ and a defocus amount $\Delta$ is represented by the following expression 2. A diameter (mm) is denoted by D. A focal length (mm) is denoted by f. A wavelength (nm) is denoted by $\lambda$.

$$Z_{n,m}(\rho, \theta) = \sum_{s=0}^{n/2} \rho^{n-2s} R(s) \quad (m = 0) \qquad \text{(Expression 1)}$$

$$Z_{n,m}(\rho, \theta) = \sum_{s=0}^{(n-|m|)/2} \rho^{n-2s} R(s) \cos(m\theta) \quad (m > 0)$$

$$Z_{n,m}(\rho, \theta) = \sum_{s=0}^{(n-|m|)/2} \rho^{n-2s} R(s) \sin(m\theta) \quad (m < 0)$$

$$R(s) = (-1)^s \frac{(n-s)!}{s!\left(\frac{n+|m|}{2}-s\right)!\left(\frac{n-|m|}{2}-s\right)!}$$

$$\Delta = \frac{\left(\sqrt{f^2 + \frac{D^2}{4}} - 2\lambda K_4\right)^2 - f^2 - \frac{D^2}{4}}{2\left\{f - \left(\sqrt{f^2 + \frac{D^2}{4}} - 2\lambda K_4\right)\right\}} \qquad \text{(Expression 2)}$$

Figure 10:
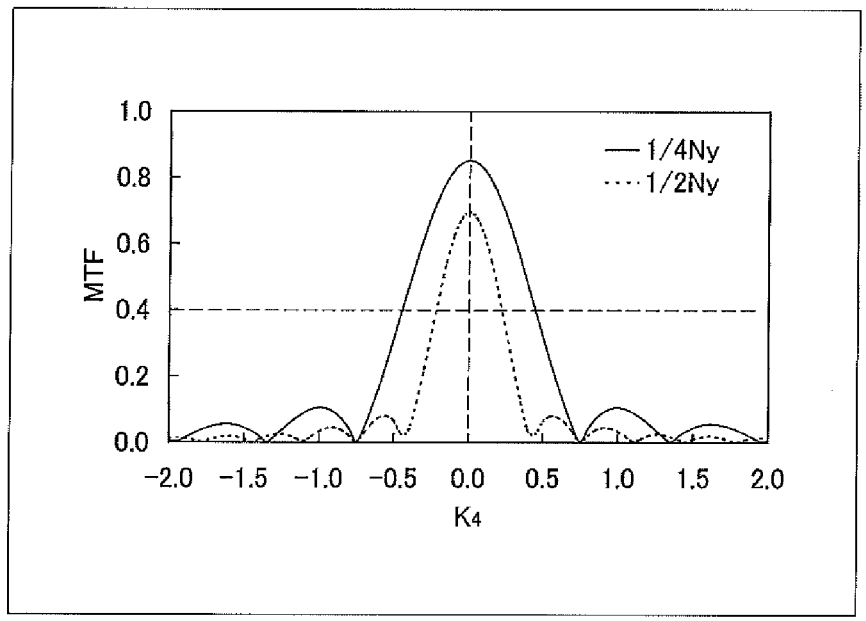
FIG. 10 is a graph illustrating defocus MTF of the standard optical lens.

As shown in FIG. 10, the defocus MTF relative to the coefficient $K_4$ of the standard optical lens depicts a curve symmetrical about the best focus position ($K_4$=0.0). The MTF of the high frequency image at ½ Ny at the best focus position is 0.69. The MTF of the low frequency image at ¼ Ny at the best focus position is 0.85. Hence, at the best focus position of the standard optical lens, the ratio of the MTF of the low frequency image at ¼ Ny relative to the MTF of the high frequency image at ½ Ny is approximately 1.23.

The range of the coefficient $K_4$ in which the ratio of the defocus MTF of the low frequency image at ¼ Ny relative to the defocus MTF of the high frequency image at ½ Ny is less than or equal to 3 and in which the best focus position ($K_4$=0.0) is included is a range allowed for defocusing in which characters or the like are correctly recognized by the software. Hereinafter, this range is referred to as the defocus range.

Figure 11:
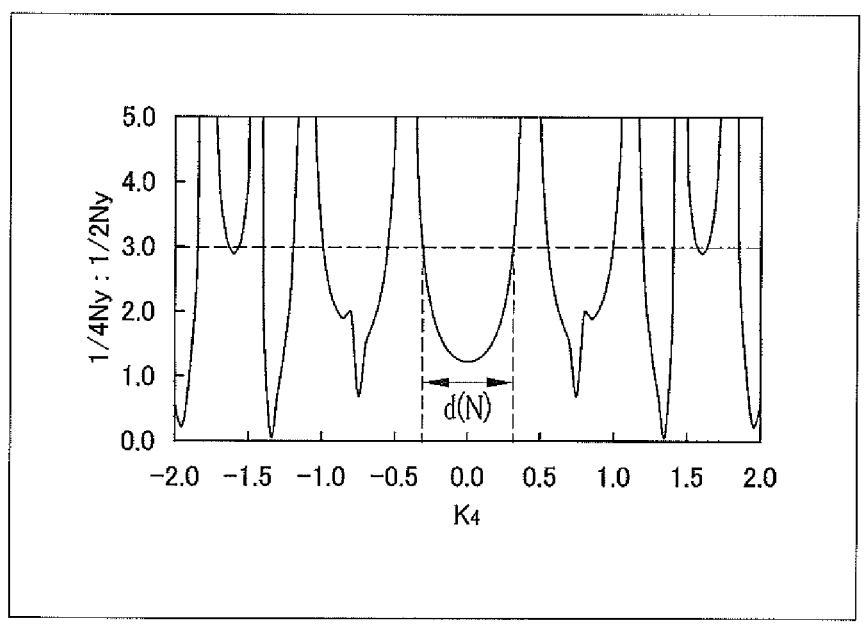
FIG. 11 is a graph illustrating a defocus range of the standard optical lens.

As shown in FIG. 11, as for the standard optical lens, the defocus range d(N) is $-0.30 \leq K_4 \leq +0.30$. Its width W(N) is 0.6. The magnitude of a defocus range d(N) on a negative side from the best focus position ($K_4$=0.0) is 0.3.

The EDoF imaging system 10 aims to extend the depth of field to be greater than that of the above-described standard optical lens. It is preferable that the focus extending optical system 11 has the defocus range greater than at least the defocus range of the standard optical lens. It is desired that the magnitude of the defocus range on the negative side from the best focus position is greater than that of the standard optical lens especially when the image sensor 12 is disposed at the best focus position and the near view image is restored based on a value of the defocus MTF on the negative side.

Namely, the defocus range of the focus extending optical system 11 is preferably greater than or equal to 0.6. The magnitude of the defocus range on the negative side is preferably greater than or equal to 0.3.

Three examples of the focus extending optical systems satisfying the above requirements are described as focus extending optical systems #6 to #8 in the following.

Figure 12:
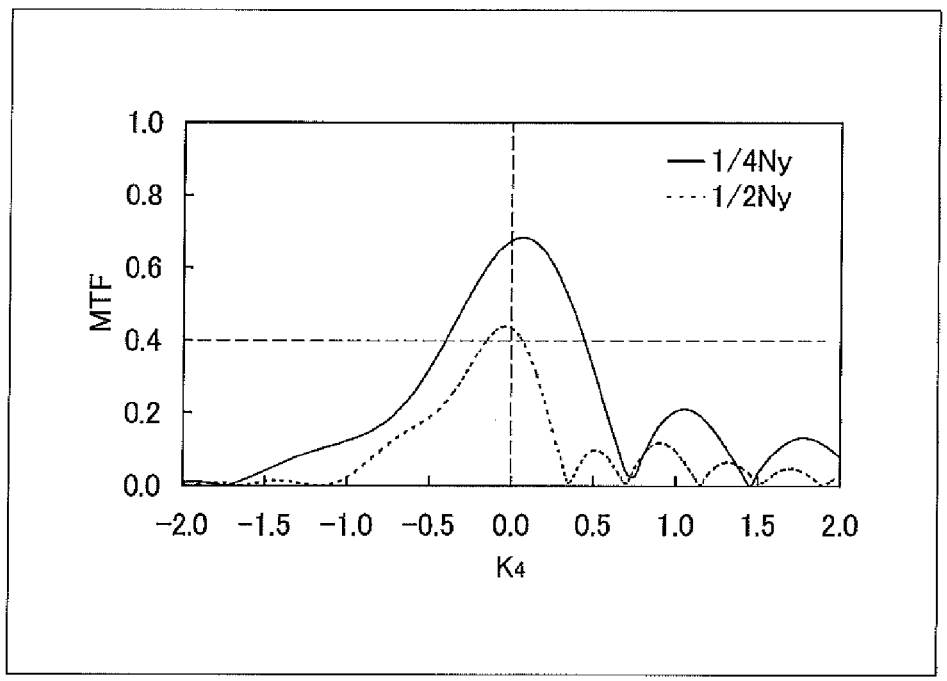
FIG. 12 is a graph illustrating defocus MTF of a focus extending optical system #6.

As shown in FIG. 12, at the best focus position of the focus extending optical system #6, the MTF of the high frequency image at ½ Ny is 0.43. The MTF of the low frequency image at ¼ Ny is 0.68. In the case of the focus extending optical system #6, the ratio of the MTF of the low frequency image at ¼ Ny relative to the MTF of the high frequency image at ½ Ny is approximately 1.58 at the best focus position.

Figure 13:
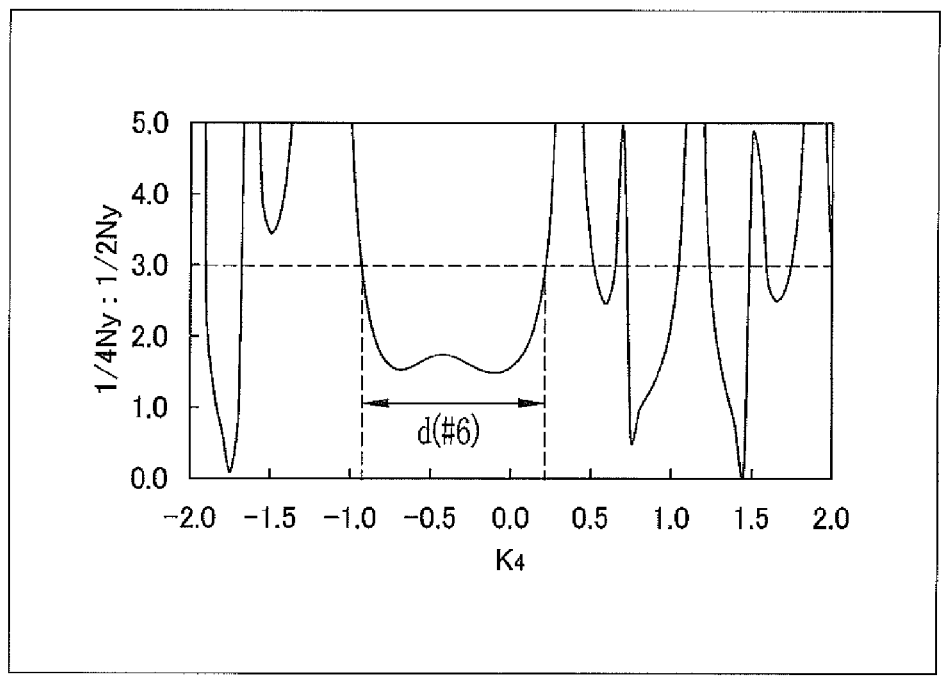
FIG. 13 is a graph illustrating a defocus range of the focus extending optical system #6.

As shown in FIG. 13, a defocus range d(#6) of the focus extending optical system #6 is $-0.90 \leq K_4 \leq +0.20$. Its width W(#6) is 1.1. The width W(#6) is greater than the width W(N) of the standard optical lens. The magnitude of the defocus range d(#6) on the negative side is 0.90, which is greater than that of the standard optical lens.

Figure 14:
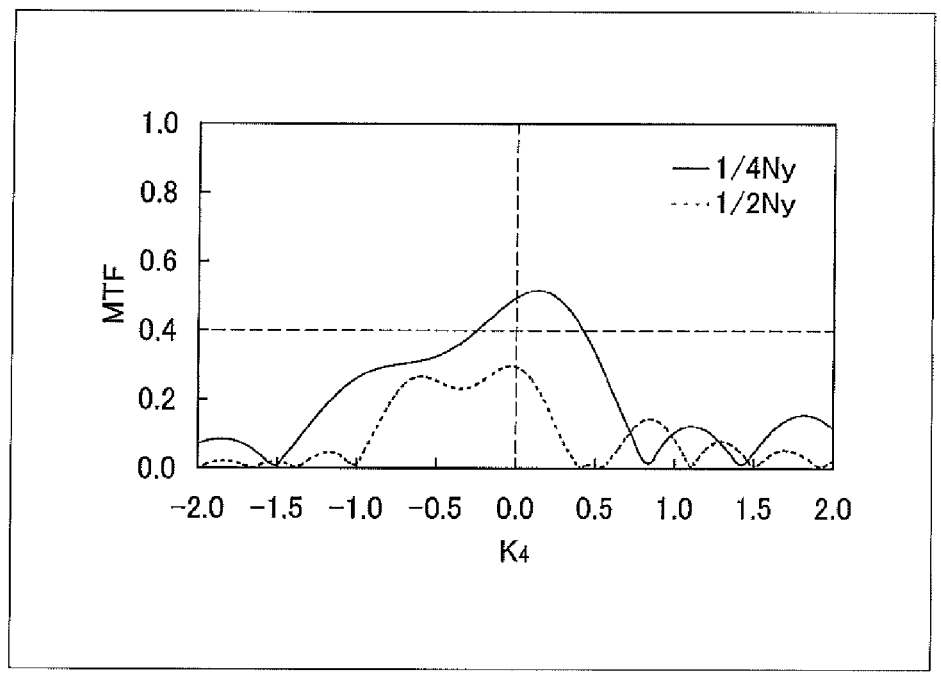
FIG. 14 is a graph illustrating defocus MTF of a focus extending optical system #7.

As shown in FIG. 14, at the best focus position of a focus extending optical system #7, the MTF of the high frequency image at ½ Ny is 0.29. The MTF of the low frequency image at ¼ Ny is 0.49. In the case of the focus extending optical system #7, the ratio of the MTF of the low frequency image at ¼ Ny relative to the MTF of the high frequency image at ½ Ny is approximately 1.69 at the best focus position.

Figure 15:
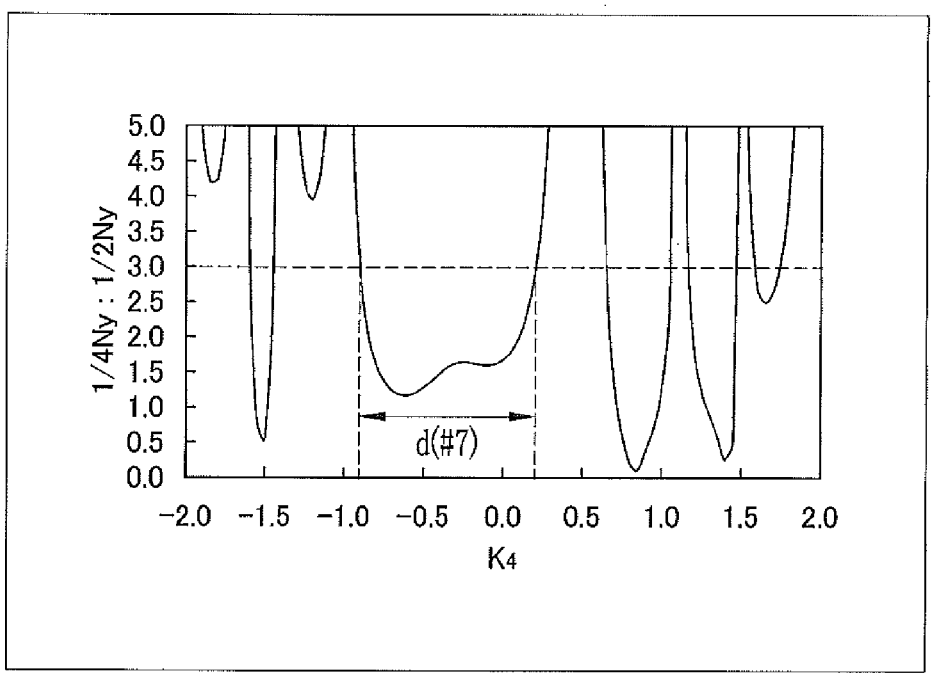
FIG. 15 is a graph illustrating a defocus range of the focus extending optical system #7.

As shown in FIG. 15, a defocus range d(#7) of the focus extending optical system #7 is $-0.90 \leq K_4 \leq +0.20$. The width W (#7) is 1.1. Hence, the width W (#7) is greater than the width W(N) of the standard optical lens. Magnitude of the defocus range d(#7) on the negative side is 0.90, which is greater than that of the standard optical lens.

Figure 16:
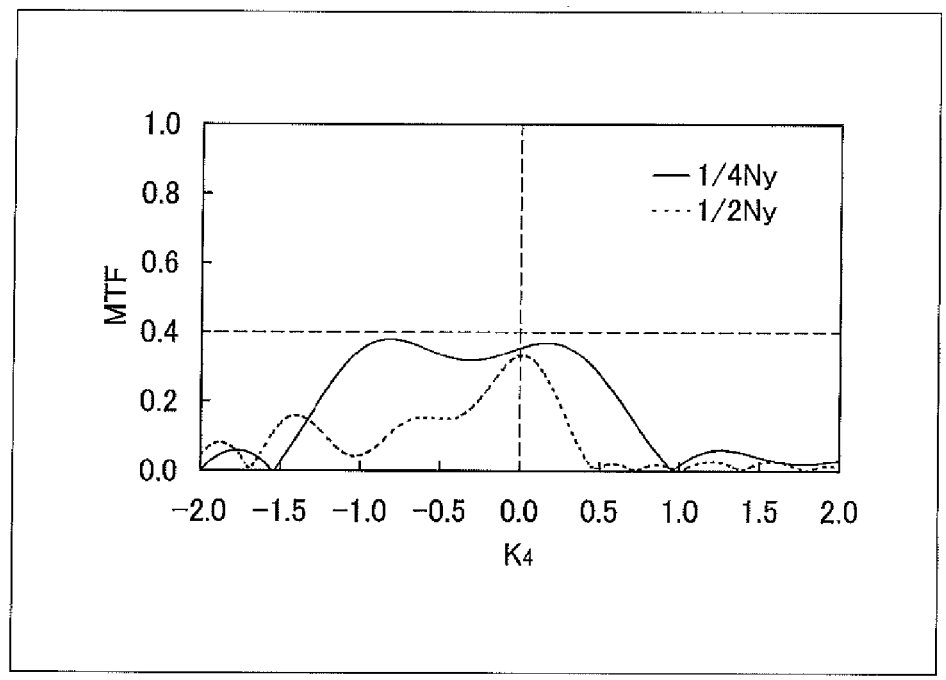
FIG. 16 is a graph illustrating defocus MTF of a focus extending optical system #8.

As shown in FIG. 16, at the best focus position of a focus extending optical system #8, the MTF of the high frequency image at ½ Ny is 0.23. The MTF of the low frequency image at ¼ Ny is 0.35. In the case of the focus extending optical system #8, the ratio of the MTF of the low frequency image at ¼ Ny relative to the MTF of the high frequency image at ½ Ny is approximately 1.52 at the best focus position.

Figure 17:
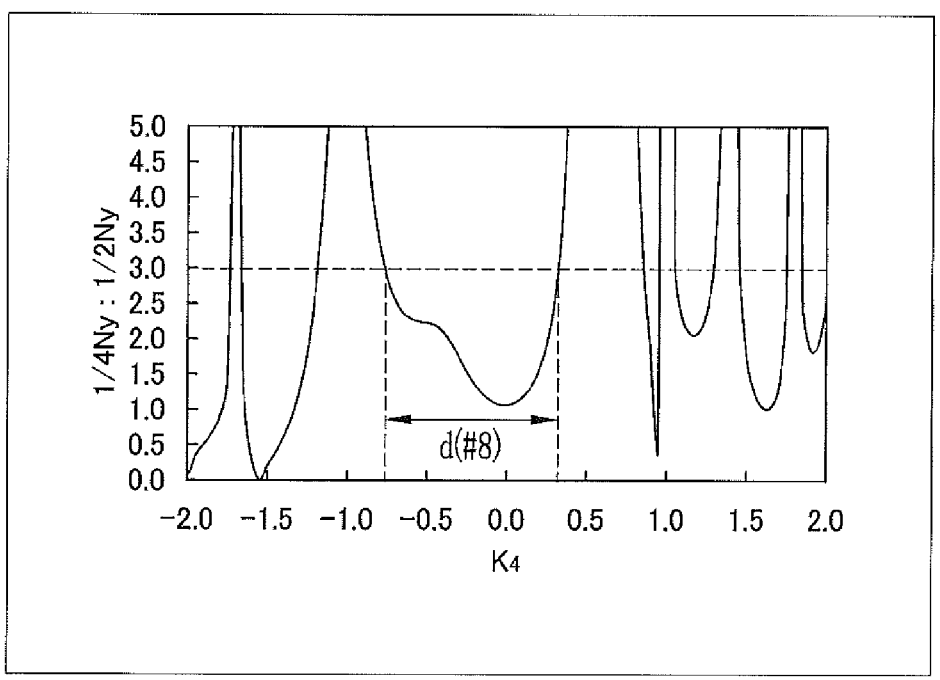
FIG. 17 is a graph illustrating the defocus range of the focus extending optical system #8.

As shown in FIG. 17, a defocus range d(#8) of the focus extending optical system #8 is $-0.75 \leq K_4 \leq +0.30$. Its width W(#8) is 1.05. Hence, the width W(#8) is greater than the width W(N) of the standard optical lens. Magnitude of the defocus range d (#8) on the negative side is 0.75, which is greater than that of the standard optical lens.

Note that the magnitude of the defocus range on the negative side needs to be greater than or equal to 0.3 that is equivalent to that of the standard optical lens. The magnitude of the defocus range on the negative side is preferably greater than or equal to 0.6 that is twice as much as that of the standard optical lens. It is more preferable that the magnitude of the defocus range on the negative side is greater than or equal to 0.9, similar to the focus extending optical systems #6 and #7.

Figure 18A:
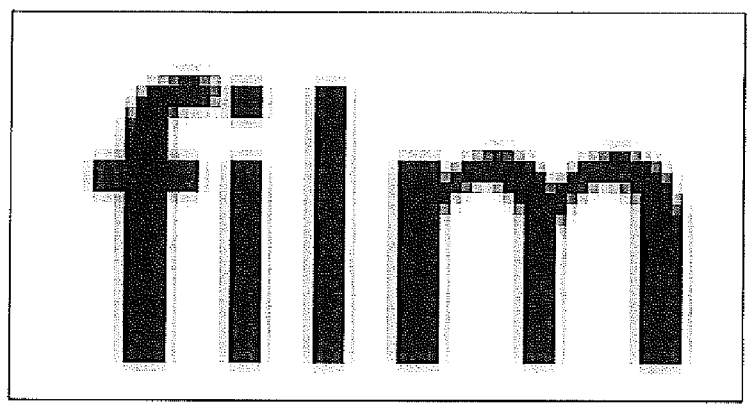
FIG. 18A is an example of an image captured with the standard optical lens.
Figure 18B:
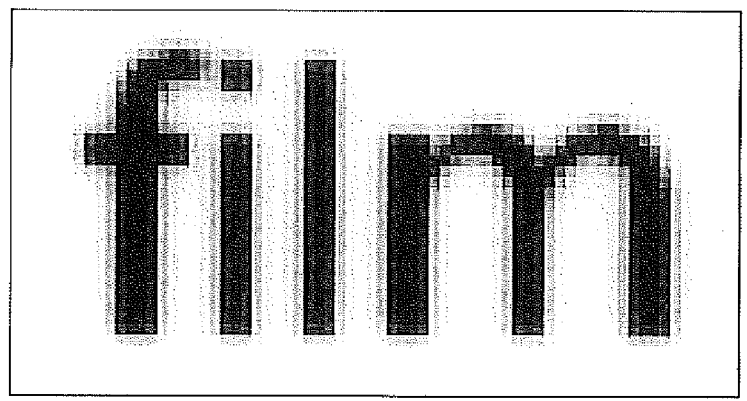
FIG. 18B is an example of an image captured with the focus extending optical system #6.
Figure 18C:
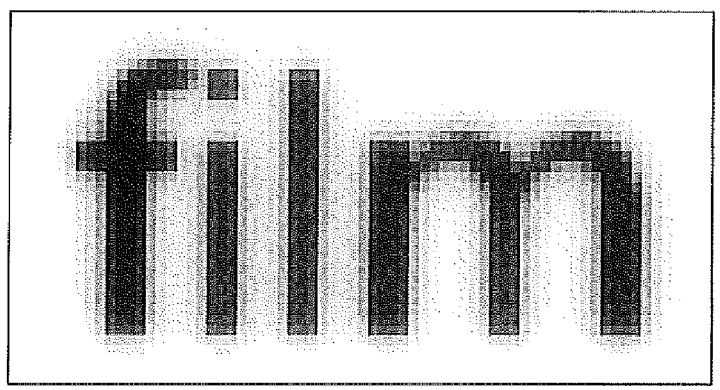
FIG. 18C is an example of an image captured with the focus extending optical system #7.
Figure 18D:
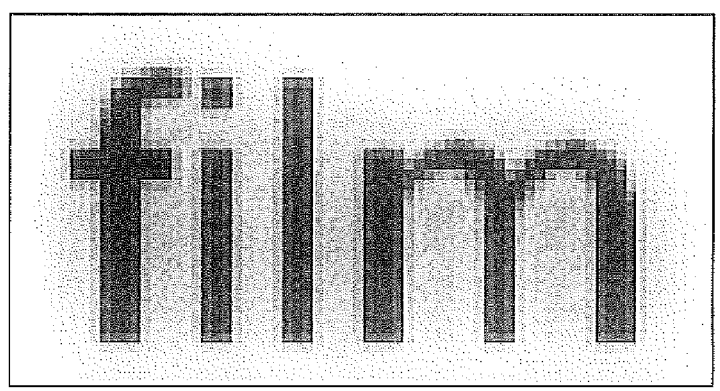
FIG. 18D is an example of an image captured with the focus extending optical system #8.

Note that FIG. 18A is a near view image obtained using the standard optical lens illustrated in FIGS. 10 and 11. FIGS. 18B, 18C, and 18D are near view images obtained using the focus extending optical systems #6 to #8, respectively. The focus extending optical systems #6 to #8 are illustrated in FIGS. 12 to 17. As shown by comparison between the graphs in FIGS. 10 to 17 and the images 18A to 18D, the contrast of the characters "film" decreases as the MTF at ¼ Ny decreases, but these near view images are obtained within a range satisfying the condition that the MTF at ¼ Ny is less than or equal to three times the MTF at ½ Ny. Hence, the software accurately recognizes the characters "film" in each image. Although being recognizable to the human eyes and the software, an unnatural image with apparent coloring, for example, the image illustrated in FIG. 18D obtained using the focus extending optical system #8, is not preferable.

The coloring occurs due to increase of influence of optical lens flare or the like caused by reduction of the MTF at ¼ Ny. The coloring appears not only in the near view image but also in the distant view image in a similar manner. Hence, in the focus extending optical system 11, it is preferable that the ratio between the frequency MTF at ½ Ny and the frequency MTF at ¼ Ny and the defocus range satisfy the above-described conditions and that the MTF at ¼ Ny has certain magnitude at least at the best focus position.

To be more specific, the MTF at ¼ Ny at least at the best focus position is preferably greater than or equal to 0.4 and more preferably greater than or equal to 0.5. This condition, that is, the MTF at ¼ Ny at least at the best focus position is greater than or equal to 0.4, substantially allows FIGS. 18B and 18C, but excludes FIG. 18D.

Note that, in the above embodiment, the image processor 13 performs the restoration process to produce the image 15 in which the depth of field is extended. The depth of field may be extended solely by the focus extending optical system 11, depending on the MTF performance of the focus extending optical system 11. In this case, the restoration process is not necessarily performed. An edge enhancement process and/or a contrast enhancement process may be performed instead of the restoration process to produce an image with the depth of field extended in a simplified manner, depending on the MTF performance of the focus extending optical system 11. In these cases, the images are produced quickly because the restoration process is omitted. Hence, these methods are effective in capturing moving images. The EDoF imaging system 10 with a function of the restoration process may not perform the restoration process in capturing the moving images.

Note that, the image sensor 12 may be a CCD type image sensor or a CMOS type image sensor. The image sensor of another structure may be used.

Note that, in the above embodiment, the focus extending optical system 11 converges the light rays, on and close to the center including the optical axis, to the front side (the object 14 side), and converges the light rays passing an outer portion to the rear side (the image sensor 12 side). Conversely, the light rays on and close to the center including the optical axis may be converged to the rear side (the image sensor 12 side) and the light rays passing the outer portion may be converged to the front side (the object 14 side).

Note that, the focus extending optical system 11 comprises the two optical lenses 11a and 11b, but the number of the optical lens (es) other than the focus extender 16 may be one or three or more. A surface shape of each of the optical lenses 11a and 11b is not limited and may include a spherical surface. The focus extending optical system 11 includes at least one aspheric surface. The focus extender 16 may be composed of two or more optical lenses.

In the example, the focus extending optical system 11 is composed of substantially three optical lenses: the optical lenses 11a, 11b, and the focus extender 16. The focus extending optical system 11 may further include an optical lens with substantially no power, optical components such as an aperture stop and cover glass, an optical lens flange, an optical lens barrel, a hand-shake correction mechanism, and the like.

Various changes and modifications are possible in the present invention and may be understood to be within the present invention.

What is claimed is:

1. A focus extending optical system comprising:
   at least one optical lens for forming an image of light, from an object, on an image sensor;
   a focus extender for adjusting a wavefront so as to change a position of the image, formed by the optical lens, in accordance with a distance from an optical axis and extending a focus range;
   a condition that a value of a second Modulation Transfer Function (MTF) is less than or equal to three times a value of a first MTF being satisfied where the first MTF is an MTF at a spatial frequency of ½ Nyquist frequency of the image sensor and the second MTF is an MTF at a spatial frequency of ¼ Nyquist frequency of the image sensor.

2. The focus extending optical system of claim 1, wherein a range of a coefficient $K_4$ in which the second MTF is less than or equal to three times the first MTF includes zero and magnitude of the range is greater than or equal to 0.6 where a transmitted wavefront $\psi$ is represented by an expression $\psi = \Sigma K_j \cdot Z_j$ using Zernike polynomials $Z_j$ (n, m) and a coefficient $K_j$ and the coefficient $K_4$ represents a coefficient of a fourth term $Z_4$ (n=2, m=0) representing defocus.

3. The focus extending optical system of claim 1, wherein the range of the coefficient $K_4$ in which the second MTF is less than or equal to three times the first MTF includes zero and magnitude of the range is greater than or equal to 0.9.

4. The focus extending optical system of claim 2, wherein the range of the coefficient $K_4$ in which the second MTF is less than or equal to three times the first MTF includes zero and magnitude of the range on a negative side is greater than or equal to 0.3.

5. The focus extending optical system of claim 2, wherein the range of the coefficient $K_4$ in which the second MTF is less than or equal to three times the first MTF includes zero and magnitude of the range on a negative side is greater than or equal to 0.6.

6. The focus extending optical system of claim 1 wherein the second MTF is greater than or equal to 0.4.

7. The focus extending optical system of claim 1 wherein the second MTF is greater than or equal to 0.5.

8. The focus extending optical system of claim 1, wherein the optical lens and the focus extender are fixed so as not to move in the direction of an optical axis.

9. An Extended Depth of Field (EDoF) imaging system comprising:
   an image sensor for capturing an image of an object;
   a focus extending optical system having at least one optical lens and a focus extender, the at least one optical lens forming the image of light, from the object, on the image sensor, the focus extender adjusting a wavefront so as to change a position of the image, formed by the optical lens, in accordance with a distance from an optical axis and extending a focus range;
   a condition that a value of a second Modulation Transfer Function (MTF) is less than or equal to three times a value of a first MTF being satisfied where the first MTF is an MTF at a spatial frequency of ½ Nyquist frequency of the image sensor and the second MTF is an MTF at a spatial frequency of ¼ Nyquist frequency of the image sensor.

10. The EDoF imaging system of claim 9, further comprising an image processor for performing a restoration process on data, outputted from the image sensor, to produce an image in which depth of field is extended.

* * * * *